United States Patent [19]

De Palma et al.

[11] E Re. 29,091

[45] Reissued Dec. 28, 1976

[54] RADIATION-REDISTRIBUTIVE DEVICES

[75] Inventors: James J. De Palma, Pittsford; Harold F. Langworthy, Rochester, both of N.Y.

[73] Assignee: Eastman Kodak Company, Rochester, N.Y.

[22] Filed: Aug. 25, 1975

[21] Appl. No.: 607,645

Related U.S. Patent Documents

Reissue of:

[64] Patent No.: 3,754,813
Issued: Aug. 28, 1973
Appl. No.: 207,082
Filed: Dec. 13, 1971

[52] U.S. Cl. ..... 350/127; 350/125; 350/126

[51] Int. Cl.[2] ..... G03B 21/60

[58] Field of Search ..... 350/117, 126–129, 350/125

[56] References Cited

UNITED STATES PATENTS

| | | | |
|---|---|---|---|
| 1,970,358 | 8/1934 | Bull et al. | 350/127 |
| 2,207,835 | 7/1940 | Sukumlyn | 350/117 |
| 2,480,031 | 8/1949 | Kellogg | 350/127 |
| 2,510,344 | 6/1950 | Law | 350/128 |
| 2,804,801 | 9/1957 | Mihalakis | 350/129 |

*Primary Examiner*—Richard A. Wintercorn
*Attorney, Agent, or Firm*—John D. Husser

[57] ABSTRACT

Devices for redistributing incident radiation in a prescribed manner. Such devices comprise a multitude of contiguous optical microelements, each of such microelements being contoured and oriented to redistribute incident radiation, emanating from an intended irradiating source, only throughout an angular field just large enough to encompass a predefined region wherein the redistributed radiation has particular utility. Moreover, the contour and orientation of each microelement is such as to produce substantially uniform radiance throughout such predefined region of utility, and to redirect extraneous or undesirable radiation incident thereon away from said predefined region. The radiation-redistributive devices of the invention are particularly useful as front or rear projection screens, lighting reflectors or refractors, illumination aids for photographic prints, traffic signs, advertisements, etc.

18 Claims, 22 Drawing Figures

JAMES J. DePALMA
HAROLD F. LANGWORTHY
INVENTORS

BY Warren W. Kurz
ATTORNEY

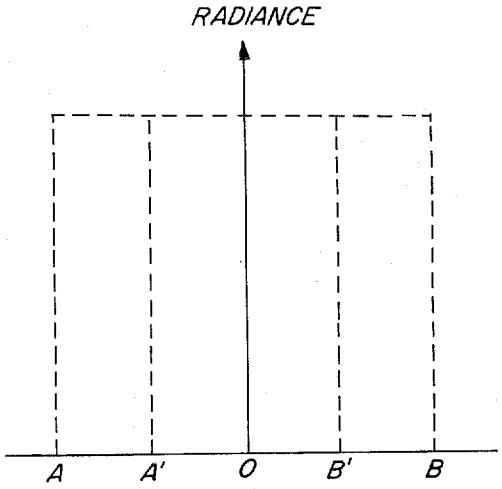
FIG. 3
FIG. 4
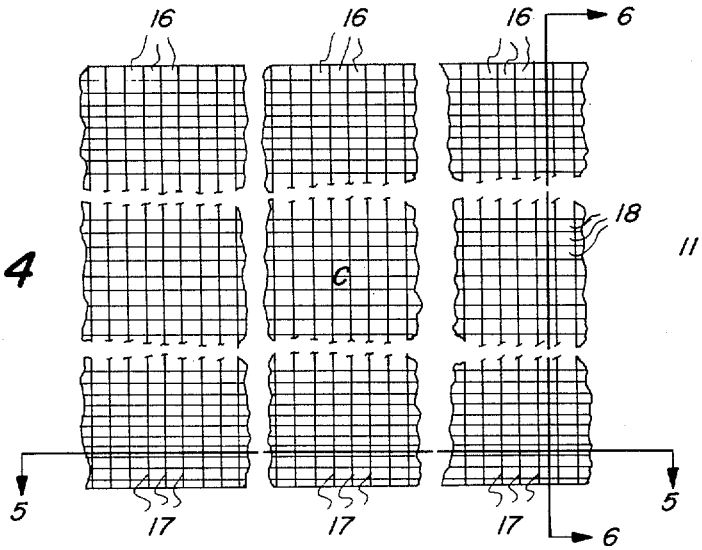
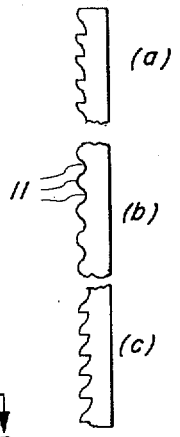
FIG. 6
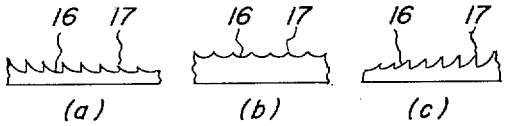
FIG. 5
JAMES J. DePALMA
HAROLD F. LANGWORTHY
INVENTORS
BY Warren W. King
ATTORNEY JAMES J. DePALMA
HAROLD F. LANGWORTHY
INVENTORS

BY

Warren W. Kurz
ATTORNEY

JAMES J. DePALMA
HAROLD F. LANGWORTHY
INVENTORS

BY
Warren W. Kurz
ATTORNEY

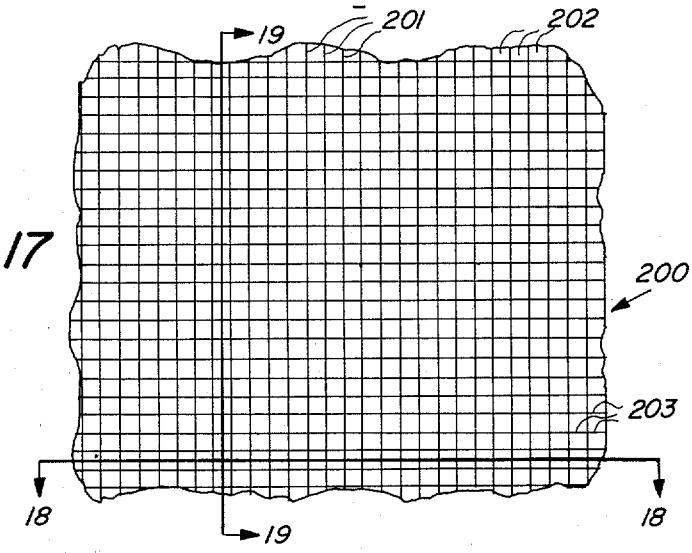
FIG. 17
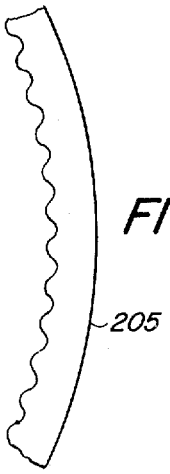
FIG. 19
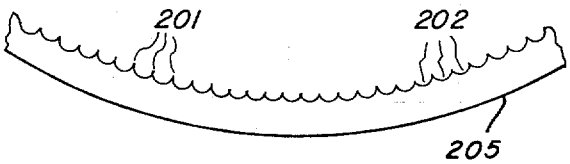
FIG. 18
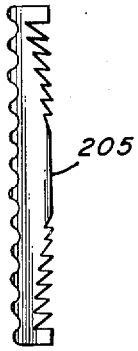
FIG. 19a
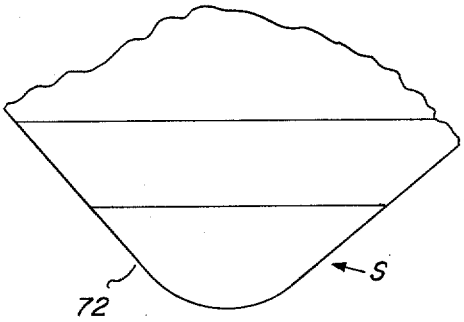
FIG. 10
FIG. 18a
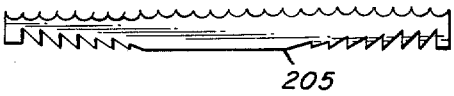
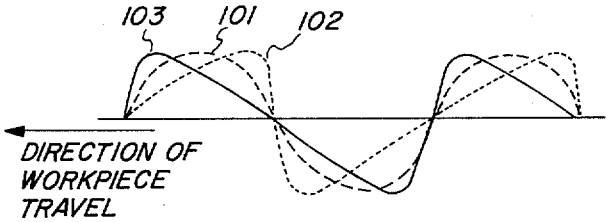
FIG. 12
JAMES J. DePALMA
HAROLD F. LANGWORTHY
INVENTORS
BY Warren W. Kurz
ATTORNEY JAMES J. DePALMA
HAROLD F. LANGWORTHY
INVENTORS BY Warren W. Kurz

ATTORNEY

JAMES J. DePALMA
HAROLD F. LANGWORTHY
INVENTORS

BY Warren W. Kurz
ATTORNEY

FIG. 14
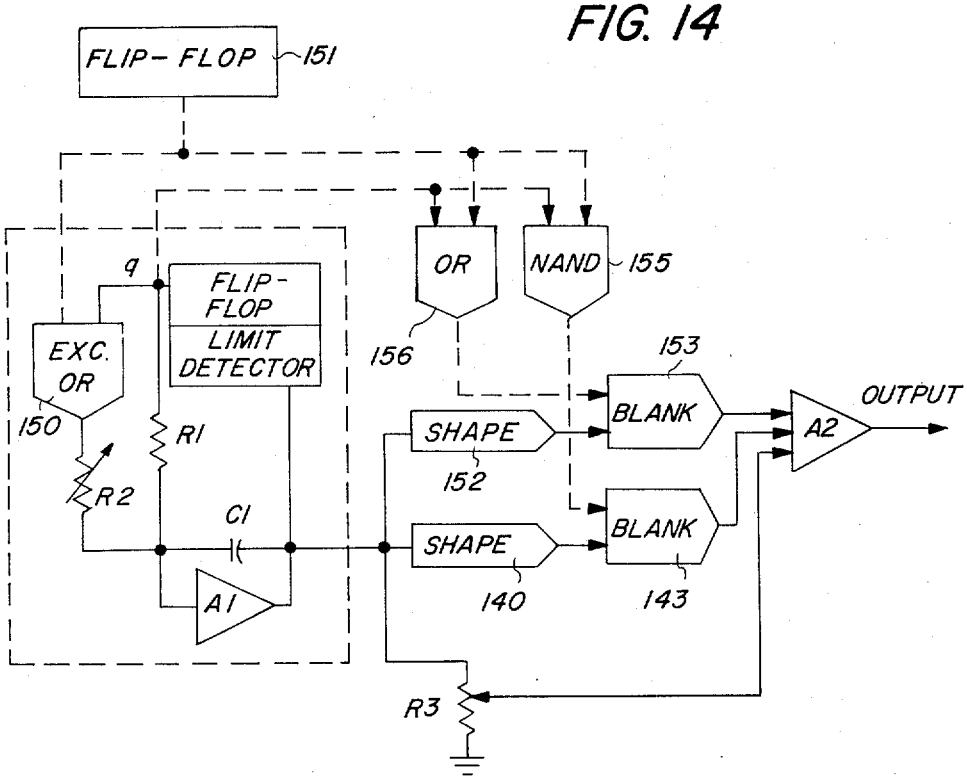
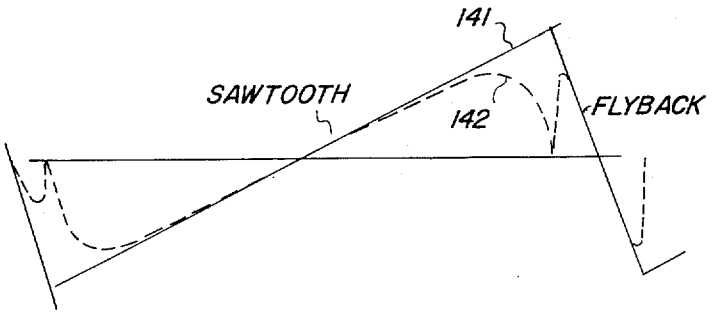
FIG. 15
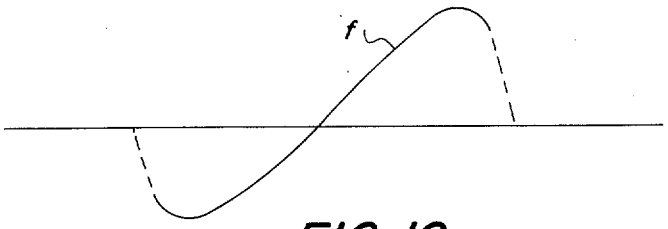
FIG. 16
JAMES J. DePALMA
HAROLD F. LANGWORTHY
INVENTORS
BY Warren W. Kurz
ATTORNEY JAMES J. DePALMA
HAROLD F. LANGWORTHY
INVENTORS

BY

Warren W. Long

ATTORNEY

RADIATION-REDISTRIBUTIVE DEVICES

Matter enclosed in heavy brackets [ ] appears in the original patent but forms no part of this reissue specification; matter printed in italics indicates the additions made by reissue.

CROSS-REFERENCE TO RELATED APPLICATIONS

References made to the commonly assigned copending application Ser. No. 207,334 entitled "Method and Apparatus for Fabricating Radiation-Redistributive Devices," filed concurrently herewith in the names of Robert N. Wolfe, et al., *now U.S. Pat. No. 3,765,281 issued Oct. 16, 1973.*

BACKGROUND OF THE INVENTION

In general, the present invention relates to improvements in projection screens and other radiation-redistributive devices, such as lighting reflectors and refractors, illumination aids for photographic prints, traffic signs, advertisements, etc.

Heretofore, a wide variety of radiation-redistributive devices [has] *have* been proposed to achieve such features as a definitely controllable field through which incident radiation is redistributed, uniform radiance throughout such field, high efficiency due to a definite separation of the field of redistribution from the environmental field and due to minimum absorption losses at the redistributing surface of such devices, and a favorable rejection of radiation impinging on the device from sources other than those intended for irradiating the device.

In attempting to provide radiation-redistributive devices having one or more of the features mentioned above, two approaches have been taken. One approach is purely empirical in nature and involves the evaluation of commercially available, inherently reflective, refractive, or diffuse materials to determine the utility thereof for a particular application. Exemplary of the projection screens developed through such an empirical approach are the volume and surface diffuser-type rear projection screens, and the aluminum foil front projection screens disclosed in the commonly assigned U.S. Pat. No. 3,408,132, high reflectance projection screens commercially available under the trademark Kodak Ektalite Projection Screen.

The second approach toward the provision of improved radiation-redistributive devices is analytical in nature, involving the derivation of mathematical expressions to define the contour which each elemental area of the redistributing surface must possess in order to achieve a desired redistribution of incident radiation, and the fabrication of an optical surfaces in accordance with such expressions. Lenticular projection screens and general lighting refractors are exemplary of such an analytical approach.

Notwithstanding the [approach] *two different approaches* taken, radiation-redistributive devices heretofore proposed have not been totally satisfactory in all respects. Usually, certain desirable features are severely compromised to achieve other features which are deemed more desirable for a particular application. For instance, in the case of projection screens, several screens have been proposed having reflecting or refracting surfaces which, at least in theory, are capable of redistributing incident-image light in such a manner that the luminance of every elemental area on the screen surface is substantially constant throughout a predefined angular field of observation. Such screens, however, often suffer the disadvantages of being inefficient or wasteful of available image light and of being difficult, if not, for all practical purposes, totally impractical to manufacture in large quantities. See, for instance, the screens disclosed in U.S. Pat. No. 3,257,900 and U.S. Pat. No. 2,870,673. On the other hand, projection screens having highly efficient and readily manufacturable surfaces are often incapable of distributing incident image light uniformly and in a controlled manner, such surfaces commonly exhibiting "hot spots" or regions of non-uniform luminance.

SUMMARY OF THE INVENTION

Accordingly, one of the objects of the present invention is to provide a radiation-redistributive device which not only makes maximum utilization of radiation emanating from an intended irradiating source by redistributing substantially all of such radiation only throughout a region wherein the redistributed radiation has utility, but also redistributes incident radiation in such a manner that substantially uniform radiance is produced throughout such region of utility.

Another object of the invention is to provide a radiation-redistributive device of the above type which, upon being irradiated by extraneous or nondesirable radiation emanating from a source other than that intended for irradiating the device, redistributes or redirects such nondesirable radiation away from said region of utility, thereby maximizing the signal-to-noise ratio for any environmental light condition.

A further object of this inventon is to provide radiation-redistributive devices of the above type which are readily manufacturable in large quantities.

In accordance with the present invention, the above objects are achieved by the provision of a radiation-redistributive device which comprises a plurality of contiguous optical microelements, each being contoured substantially in accordance with a mathematical expression requiring that all radiation incident thereon be redistributed therefrom such as to produce uniform radiance throughout a predefined angular field and substantially zero radiance outside such field. Preferably, the radiation-redistributing surface of such device is planar and each of said microelements comprising said surface is uniquely contoured and arranged, depending upon its respective position on the surface, to redistribute incident radiation only throughout a solid angle just large enough to encompass a region which is intended to receive radiation from said device. Alternately, the redistributing surface of the device is substantially spherically or cylindrically curved and all of the microelements contoured substantially alike, the screen curvature assisting in redistributing incident radiation into the desired region.

In addition to the objects of the invention set forth herein above, other objects and advantages of the invention will become apparent to those skilled in the art from the ensuing description, reference being made to the accompanying drawings.

BRIEF DESCRIPTION OF THE DRAWINGS

FIG. 3 shows the ideal radiance curve for a radiation-redistributive device;

FIGS. 4–6 illustrate a reflective radiation-redistributive device, structured in accordance with a preferred embodiment of the invention, in plan view and sections taken along lines 5—5 and 6—6, respectively;

FIG. 10 is a front elevation of the cutting stylus illustrating the cutting profile thereof;

FIG. 12 illustrates the manner in which the waveform applied to the cutting stylus differs from the stylus motion produced thereby;

FIG. 14 illustrates the additional logic circuitry required to modify the circuit of FIG. 13 so as to produce the entire surface illustrated in FIGS. 4–6;

FIG. 15 illustrates the manner in which the positive-going ramp of a sawtooth waveform is shaped to a desired stylus-driving waveform;

FIG. 16 illustrates the input signal to the cutting stylus when in a cutting position displaced from center of the master;

FIGS. 17–19 illustrate a radiation-redistributive device structured in accordance with another preferred embodiment of the invention, in plan view and in section taken along lines 18—18 and 19—19, respectively; and FIGS. 18a and 19a illustrate alternative cross sections for the devices illustrated in FIG. 17.

DETAILED DESCRIPTION OF PREFERRED EMBODIMENTS

As indicated above, the radiation-redistributive devices of the invention have utility in any situation wherein it is desirable or necessary to precisely control the redistribution or redirection of radiant energy from a surface which is irradiated by a source which occupies a predictable position relative to such surface. Such devices have been found to have particular utility as projection screens, both of the front and rear projection variety, being capable of presenting to a precisely definable audience area or field of observation a projected image of substantially uniform luminance, regardless of the viewing position within such audience area. Accordingly, projection screens represent a preferred embodiment of the invention and the invention will be described hereinafter with particular reference thereto; however, it should be borne in mind that projection screens are merely exemplary of the uses for the invention, and all such uses, including those previously mentioned, are considered within the spirit and scope of the invention.

The radiation-redistributing surface of the invention devices was derived mathematically based upon the theorems of geometrical optics and upon the following postulates which are believed to define a radiation-redistribution device having ideal radiation-redistributive properties:

I. Every elemental area on the redistributing surface of the device shall redistribute all radiation incident thereon from an intended irradiating source throughout a solid angle just large enough to encompass a predefined field wherein the redistributed radiation has utility. (A radiation-redistributing surface satisfying this postulate is one of maximum efficiency, utilizing all available radiation).

II. Every elemental area on the radiation-redistributing surface of the device shall redistribute incident radiation in such a manner that the radiance of every such area will be constant, no matter where measured within the solid angle through which radiation is redistributed. (With respect to projection screens, a surface satisfying this postulate is one which will present an image of uniform brightness everywhere within the intended audience area, and no image whatsoever outside such audience area).

Figure 1:
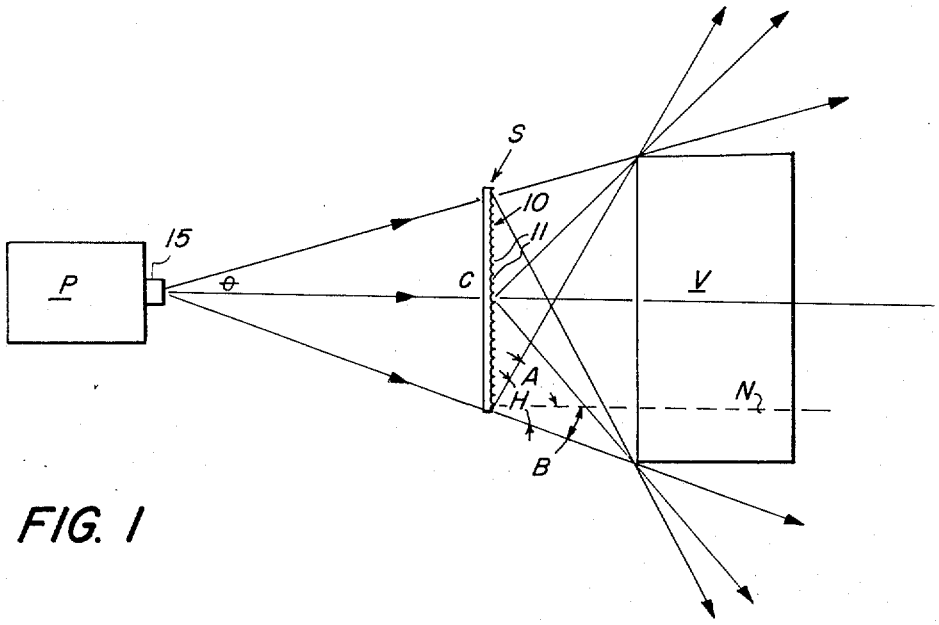
FIGS. 1 and 2 are, respectively, diagrammatical representations of rear and front projection systems, respectively, illustrating the radiation-redistributing properties of rear and front projection screens embodying the invention.
Figure 2:
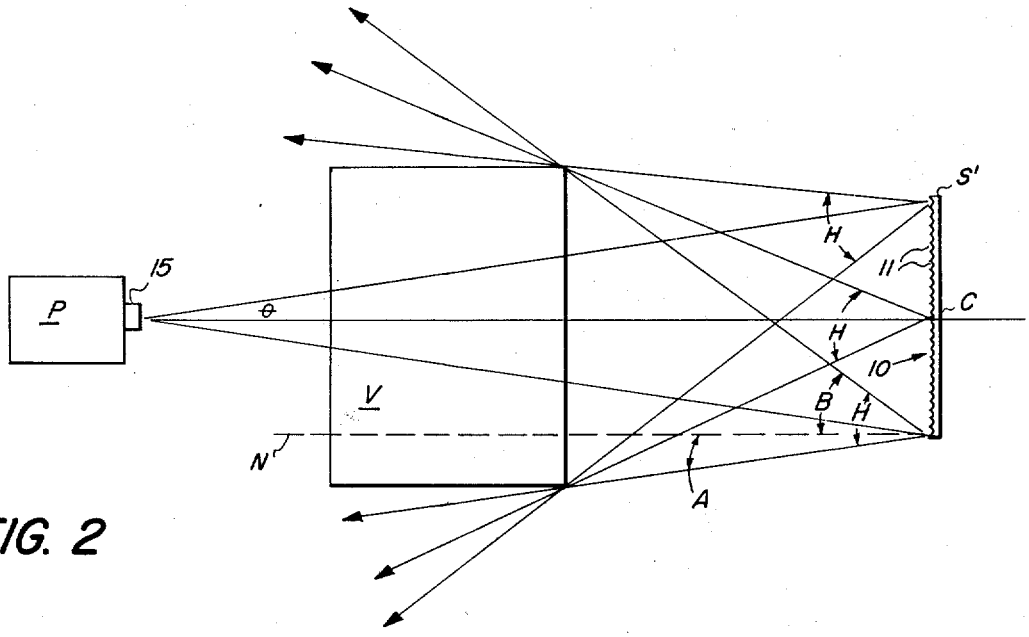

In FIGS. 1 and 2, projection systems comprising projectors P and rear and front projection screens S and S′, respectively, are shown in two dimensions. Image light or flux emanating from the projector is focused upon the surfaces 10 of the projection screens, rear projection screen S being fabricated from a transparent material. As shown, each surface comprises a plurality of contoured optical microelements 11, shown, for purposes of illustration, greatly magnified and of concave shape. Actually, each microelement is preferably of a size so as to be unresolvable by the closest intended viewer and can be either concave or convex in shape. The contour of each microelement is such that image flux incident thereon at an angle $\theta$, measured from a line connecting the projector lens 15 to the screen center C, is redistributed throughout a viewing angle H which is just large enough to encompass the predefined audience volume V. Viewing angle H consists of left and right viewing angles A and B, respectively, each being measured from a normal N to the screen surface. All angles are considered positive when measured in a counterclockwise direction from a normal to the screen surface. Because the size of the microelement is quite small relative to the distance separating the microelement from the projector, all light rays striking a particular microelement are assumed to be parallel.

It can be shown mathematically that to satisfy Postulates I and II above wherein the intended audience volume is bounded in either a transverse or longitudinal plane by audience angles A and B, every convex optical microelement comprising the radiation-redistributing surface must have transverse and longitudinal cross sections defined by at least a segment of the curve $$u = \pm f(w;n) = \pm (\sqrt{1-w}\,(\sqrt{w} - 2n) + \cos^{-1}\sqrt{w}) \qquad (1)$$

where n is the refractive index of the microelement (n being −1 when the microelement is reflective); u and w are the microelement coordinates, w being measured in a direction parallel to the path of the rays of radiation incident on the microelement and u being measured in the plane of the cross section, perpendicular to w; and w has a value within the following limits;

$\cos^2(A-\theta') \leq w \leq 1$, when f(w,n) is positive and the microelement refractive;

$\cos^2(B+\theta') \leq w \leq 1$, when f(w;n) is negative and and microelement refractive;

$\cos^2(B+\theta) \leq w \leq 1$, when f(w;n) is positive and the microelement reflective;

$\cos^2(A-\theta) \leq w \leq 1$, when f(w;n) is negative and the microelement reflective;

where $\theta$ is the projection in the u − w plane of the angles formed by a line connecting the microelement and projector, and the normal to the screen surface, and [$n = \sin\theta/\sin\theta''$] $\theta' = \sin^{-1}[\sin\theta/n]$ Similarly, it can be shown that every concave optical microelement comprising the projection screen surface must have transverse and longitudinal cross sections defined by at least a portion of the curve $$u = \pm g(w;n) = \pm(\sqrt{1+w}(\sqrt{-w}-2n)+\cos^{-1}\sqrt{-w})\sqrt{-w}). \quad (2)$$

wherein w has a value within the following limits:

$-1 \leq w \leq -\cos^2(B+\theta')$, when g(w;n) is positive and the microelement is refractive;

$-1 \leq w \leq -\cos^2(A-\theta')$, when g(w;n) is negative and the microelement is refractive;

$-1 \leq w \leq -\cos^2(A-\theta)$, when g(w;n) is positive and the microelement is reflective; and $-1 \leq w \leq -\cos^2(B+\theta)$, when g(w;n) is negative and the microelement is reflective Equations (1) and (2) above define the contour required for a microelement to provide an ideal goniphotometric response (i.e., constant radiance, between horizontal audience angles A and B, and vertical audience angles A′ and B′. (See FIG. 3). As is apparent from these equations, screen performance is independent of the size and sense (concave or convex) of each microelement relative to adjacent ones. Thus, the microelements could be of random sizes and randomly sensed over the entire screen surface so long as the contours defined by Equations (1) and/or (2) are substantially met, such contours being dependent only on the angle at which incident light impinges the microelement surface, the horizontal and vertical audience angles through which such light must be distributed to encompass the intended audience area, and, in the case of rear projection screens, the refractive index of the material from which the microelements are formed. However, to facilitate the manufacture of such screen, it is preferred that microelements be substantially the same in size and be arranged in contiguous linear rows, each microelement having a transverse cross section which is everywhere curved in the same sense, preferably concave, and a longitudinal cross section which is shaped in an opposite sense from that of adjacent microelements in the same row. Thus, the preferred longitudinal cross section of each row of microelements is one which undulates from concave to convex, etc. Such a surface is illustrated in FIGS. 4 through 6.

As shown in FIGS. 4 through 6, a screen structured in accordance with the present invention comprises a surface which defines a plurality of contiguous linear grooves 16 shown running in a vertical direction from the top to the bottom edges of the screens. Where the edges of each groove intersect with those of adjacent grooves, cusp lines 17 are formed. The transverse cross section of each groove, as depicted in FIG. 5, is everywhere concave and is defined by Equation (2) above. The depth profile or longitudinal cross section of each groove, as illustrated in FIG. 6, alternatively varies or undulates in shape from convex to concave, the convex and concave portions being defined by Equations (1) and (2), respectively. Thus, for each full wavelength of depth undulation, two microelements are formed, one concave and one convex. The longitudinal boundaries of each microelement are the lines 18 along which the sense of the depth profile changes from concave to convex, or vice versa. The lateral boundaries of each microelement are, of course, provided by cusp lines 17. As best shown in the sectional views of FIGS. 5 and 6, the microelements are gradually "tilted" as their respective displacement from screen center C increases. The degree of such tilt is determined by the size and shape of the viewing area and, hence, the values of viewing angles A and B. The sense of such tilt (i.e., toward or away from the screen center) depends on whether the screen is reflective or refractive, reflective microelements being tilted toward the screen center, as shown in FIGS. 5a, 5c, 6a, and 6c, and refractive microelements being tilted away from the screen center. Generally, the microelements are oriented with respect to each other such that the lines, formed by intersecting planes which bisect the horizontal and vertical angles through which each element distributes image light to the [the] audience, substantially intersect at a common point in the audience area.

Figure 7:
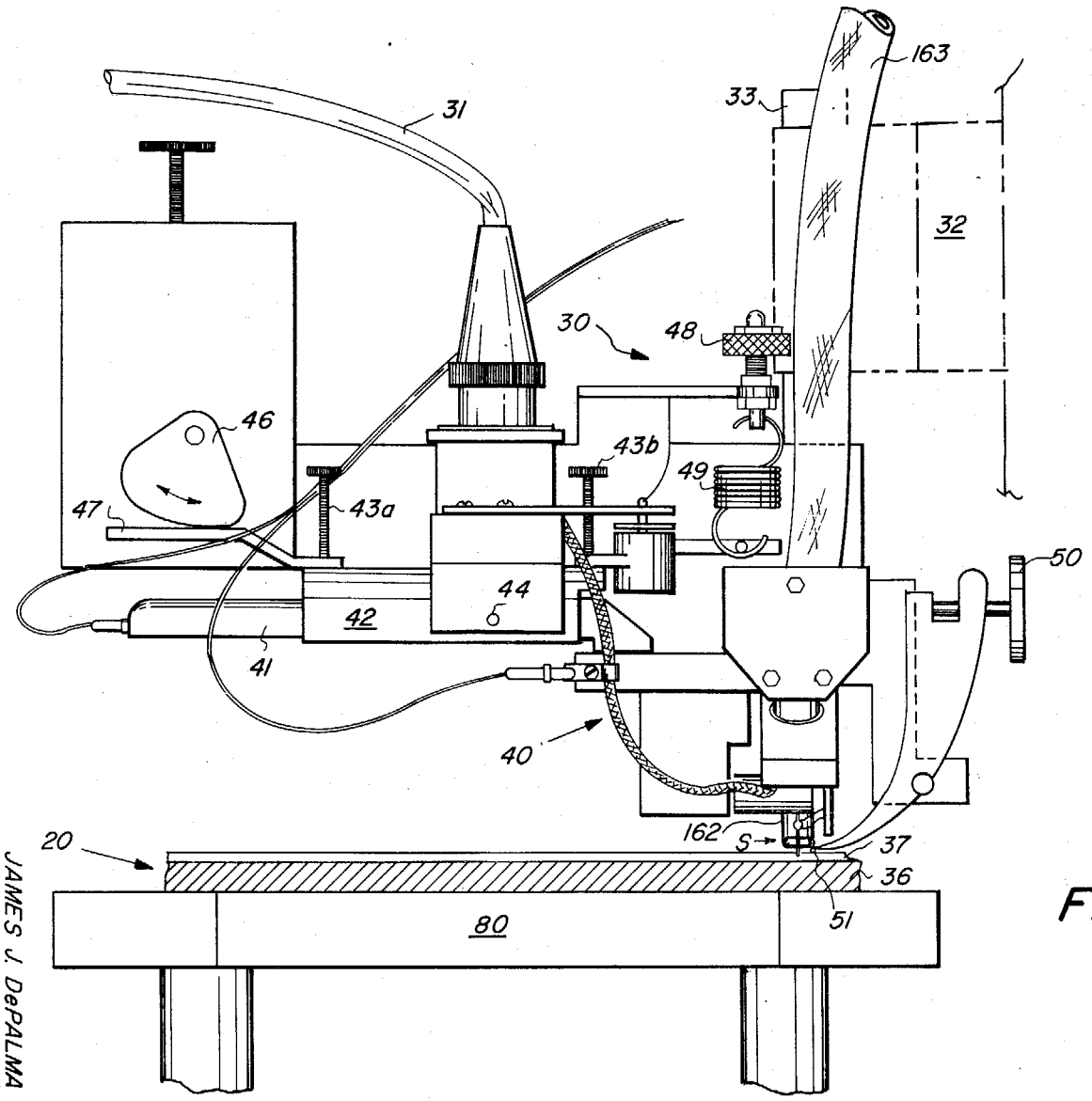
FIG. 7 is a side elevational view of apparatus used in fabricating the radiation-redistributive devices of the invention, such apparatus including a stereo sound-recording head.

To fabricate the radiation-redistributive devices of the invention, it has been found that various equipment and techniques conventionally employed in the sound recording industry can be used directly or in a modified form. In FIG. 7, apparatus used for cutting the radiation-redistributive microelements is illustrated in a side elevational view, being shown in a cutting position relative to a blank workpiece 20 wherein microelements are to be formed. While the microelements could be cut directly in any readily workable material which itself could be used as the radiation-redistributive device, the preferred method of manufacture comprises the fabrication of a master in some workable material, such as acetate or wax, from which a negative matrix or press tool of correct contour can be subsequently made. The negative matrix can then be used to produce a multitude of positive radiation-redistributive devices by such well-known economical duplicating processes as stamping or embossing. Preferred methods of replicating radiation-redistributive devices from masters are described subsequently herein.

As shown in FIG. 7, the cutting apparatus comprises a conventional stereo sound recording head 30 which includes a cutting stylus S. While a monaural sound recording head could be used, a stereo head is preferred due to the high quality of conventional stereo heads and the auxiliary equipment available for such stereo heads. As in all sound recordings heads, the cutting position of the stylus is determined by the waveform of an electrical signal applied to the recording head, such as through input cables 31. The recording head is mounted on a milling machine tool holder 32 by a cylindrical fitting 33. Means are provided for controlling the vertical position of fitting 33 in the tool holder 32 so as to provide a coarse, vertical adjustment of the recording head 30 above the workpiece. The workpiece may comprise, for instance, an aluminum plate 36 having an acetate coating 37, the thickness of which is sufficient to receive the contours of the microelements being cut. Recording head 30 comprises a cutting assembly 40 having a horizontally extending support arm 41 which is slidably mounted on precision ways disposed in a saddle 42. By this arrangement, the horizontal position of cutting assembly 40 can be varied. Set screws 43a and 43b serve to lock arm 41 in a desired horizontal position. Saddle 42 is pivotally mounted about pin 44 disposed on recording head 30 so that the cutting stylus S, which forms a part of cutting assembly 40, can be moved into engagement with coating 37. The rotational movement of a cam 46 serves to raise and lower the stylus relative to the upper surface of coating 37 by contacting an arm 47 which is rigidly coupled with saddle 42. The downward force applied to the cutting assembly is controlled by screw 48 which serves to adjust the tension in spring 49. The precise depth of cut is controlled by adjustment screw 50 which varies the vertical distance of the stylus tip from a small glass ball follower 51 which rides on the uncut surface of coating 37 a short, horizontal distance away from the stylus.

Figure 8:
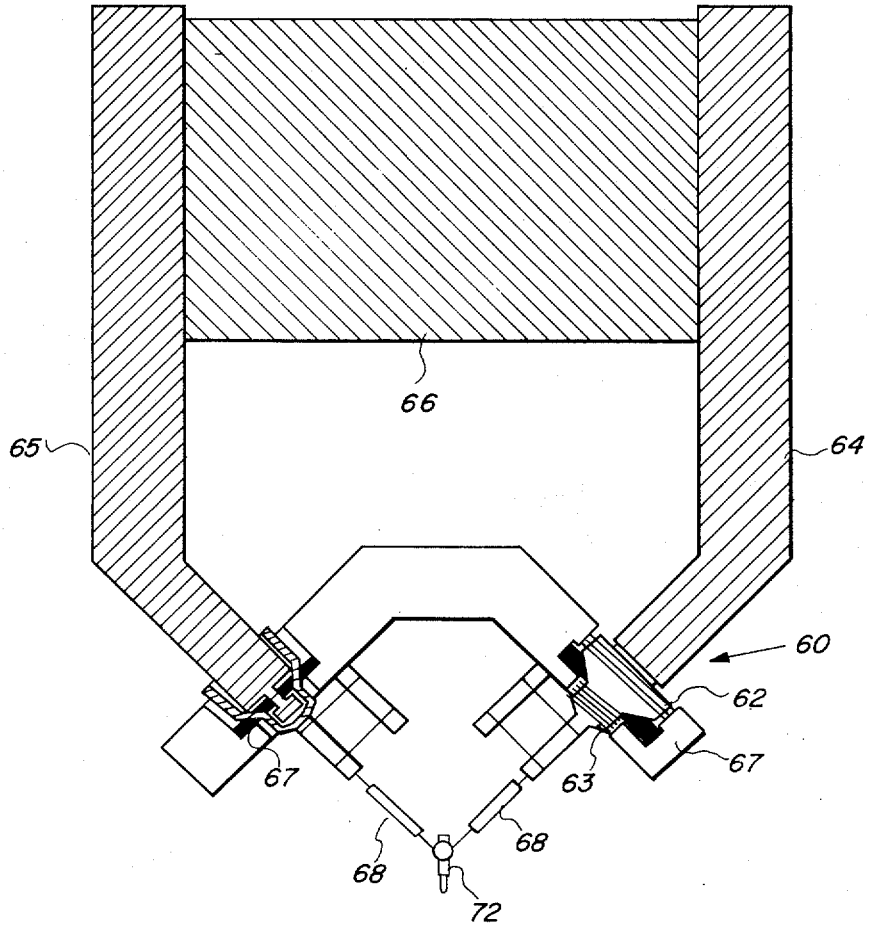
FIG. 8 is a constructional diagram of the mechanism used to drive the cutting stylus of the sound recording head illustrated in FIG. 7.

A sound recording head which has been found particularly well adapted for cutting projection screen masters is the Westrex Corporation, Model 3D Stereo Disc. As illustrated in FIG. 8 wherein a simplified constructional diagram of the mechanism which controls stylus movement is shown, each recording channel of the stereo recording head contains a magnetic coil form assembly 60, each of which contains a driving coil 62 located in separate pole pieces 64 and 65 which are attached to a single magnet 66.

The coil assmeblies are attached to the stylus holder through links 68 which are stiff longitudinally, but flexible laterally. These links are braced in the center to prevent excessive lateral compliance. This structure results in a stiff, forward driving system with a high compliance in the lateral direction.

Figure 9:
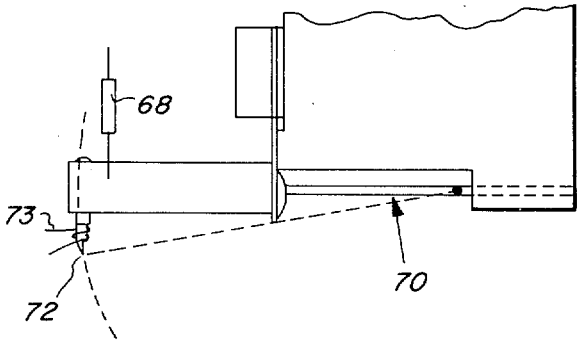
FIG. 9 is a side elvational view of the cutting stylus and support therefor.

The supporting member for the stylus is shown in FIG. 9. The use of a cantilever spring 70 permits the stylus to present a uniform impedance to complex motions in any direction in the vertical plane perpendicular to the drawing.

The cutting tip 72 of stylus S is preferably fabricated from sapphire or diamond, and is heated by heating coil 73 to a temperature such as to soften the acetate surface of the workpiece. If the surface described by the above equations were to be produced exactly, it would be necessary to use a stylus having a different cutting profile for each groove cut. However, it has been found that when the intended audience area can be encompassed by audience angles of less than approximately ±40 degrees measured from the normal, the ideal screen surface can be satisfactorily approximated by using a single cutting stylus having a cutting profile defined by Equation (1) at $\theta = 0$, and by tilting the stylus axis during the cutting operation so as always to be parallel to the plane which bisects the audience angle through which the groove being cut must distribute image flux to encompass the intended viewing area. The required curve is illustrated by the cutting profile of the stylus cutting tip 72 in FIG. 10, such curve being somewhat flattened relative to a half sinusoid.

Figure 11:
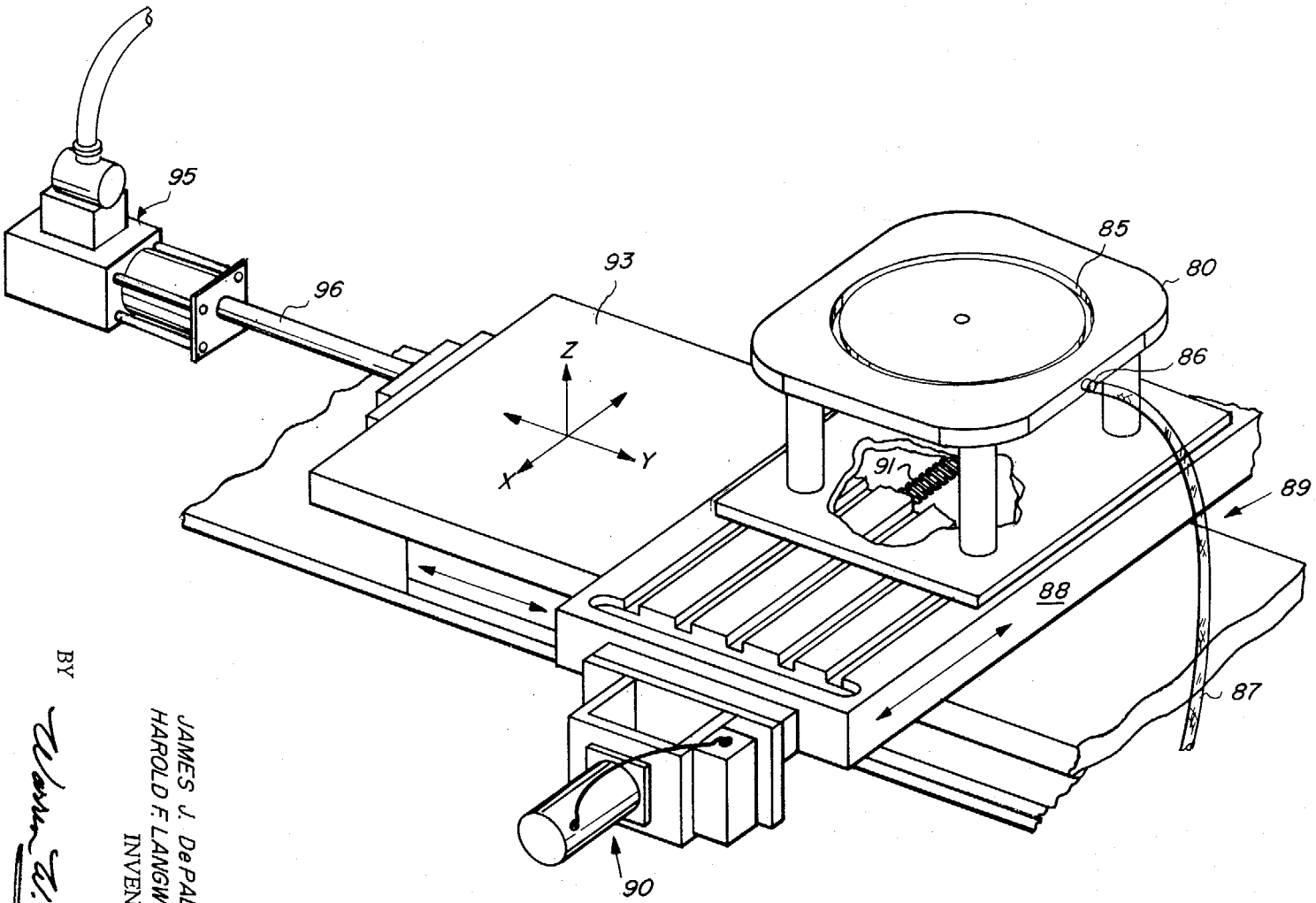
FIG. 11 is a perspective view of apparatus for translating a master from which the radiation-redistributive devices can be subsequently replicated relative to the cutting apparatus illustrated in FIG. 7.

In fabricating projection screen masters by use of the apparatus described above, the workpiece is moved relative to the heated cutting stylus in a series of equally spaced, parallel traverses. At the same time, the cutting position of the stylus is electronically varied relative to the workpiece surface to produce the desired longitudinal cross section or depth profile. Apparatus for moving the workpiece relative to the stylus is depicted in FIG. 11. As shown, such apparatus comprises a table 80 for supporting the workpiece during the cutting operation. Table 80 is preferably fabricated from a non-magnetic metal, such as aluminum, so as not to interfere with the magnetic cutting assembly 40. In the upper surface of table 80, a circular groove 85 is provided. At the base of groove 85 is an opening (not shown) which communicates with a nozzle 86 located on the edge of the table. Attached to nozzle 86 via hose 87 is a vacuum source (not shown). By this arrangement, the workpiece is securely fastened to the surface of table 80 by a vacuum coupling. Table 80 is mechanically secured to a movable workbed 88 comprising the x-y table 89 of a milling machine. Workbed 88 is movable in the x direction and its position is controlled with precision by a conventional stepping motor 90 which acts through lead screw 91. Workbed 88 itself rides atop a carriage 93, also forming a part of the x-y table of the milling machine. Carriage 93 is movable in the y direction by a hydraulic pneumatic motor 95 which precisely controls the rate which the table moves via piston rod 96.

To fabricate projection screen masters having transverse and longitudinal cross sections such as depicted in FIGS. 5 and 6, respectively, it is necessary to drive the cutting stylus with a signal, the waveform of which varies in accordance with the y-position of the stylus on the screen blank surface. Moreover, as mentioned above, it is also necessary to vary the angle at which the stylus contacts the screen blank in accordance with the x-position of the stylus on the workpiece surface.

To maintain the proper orientation between the cutting stylus and the workpiece during movement of the workpiece in the x direction, the milling machine tool holder is motorized so as to be capable of tilting the recording head in the x-z plane in accordance with an electrical input signal. The x-z position of the stylus is changed after each groove is cut so that at all times during the cutting operation the angle t between the longitudinal axis of the stylus and the work surface is:

$$t = \tan^{-1}(p/x)$$

where x is measured from the workpiece center, and p is the projection in the x-z plane of the distance from the workpiece, center to the line at which the planes which bisect the requisite audience angles of the cut grooves substantially intersect. The motorized tool holder of the milling machine is controlled by the output of stepping motor 90.

To move the cutting stylus in a vertical plane and at a rate which, when the workpiece is moved at a constant rate relative thereto, results in the longitudinal cross section or depth profile desired, the same signal must be applied, 180° out of phase, to both drive coils 62. Moreover, since the stylus is not mounted for pure vertical movement, but rather for pivotal movement on the cantilever spring 70, so as to traverse an arcuate path as shown in phantom lines, it is necessary to drive the stylus with a somewhat different waveform than that which corresponds to the longitudinal cross section desired. Referring to FIG. 12, when a waveform 101 is applied to the cutting stylus, the resulting groove has a depth profile as shown by the symmetrical waveform 102. To compensate for the asymmetry, it is necessary to drive the cutting stylus with a counterbalancing asymmetrical waveform 103 which the arcuate stylus movement converts to the depth profile desired (e.g., waveform 101). It is interesting to note that in the sound recording art, such asymmetry is automatically compensated for during playback by the pickup stylus, which is also pivotally mounted and moves along an arcuate path similar to that along which the stylus which cut the original master moved. In achieving a desired profile in projection screens, however, such asymmetry must be compensated for by circuitry for modifying the desired waveform accordingly.

Figure 13:
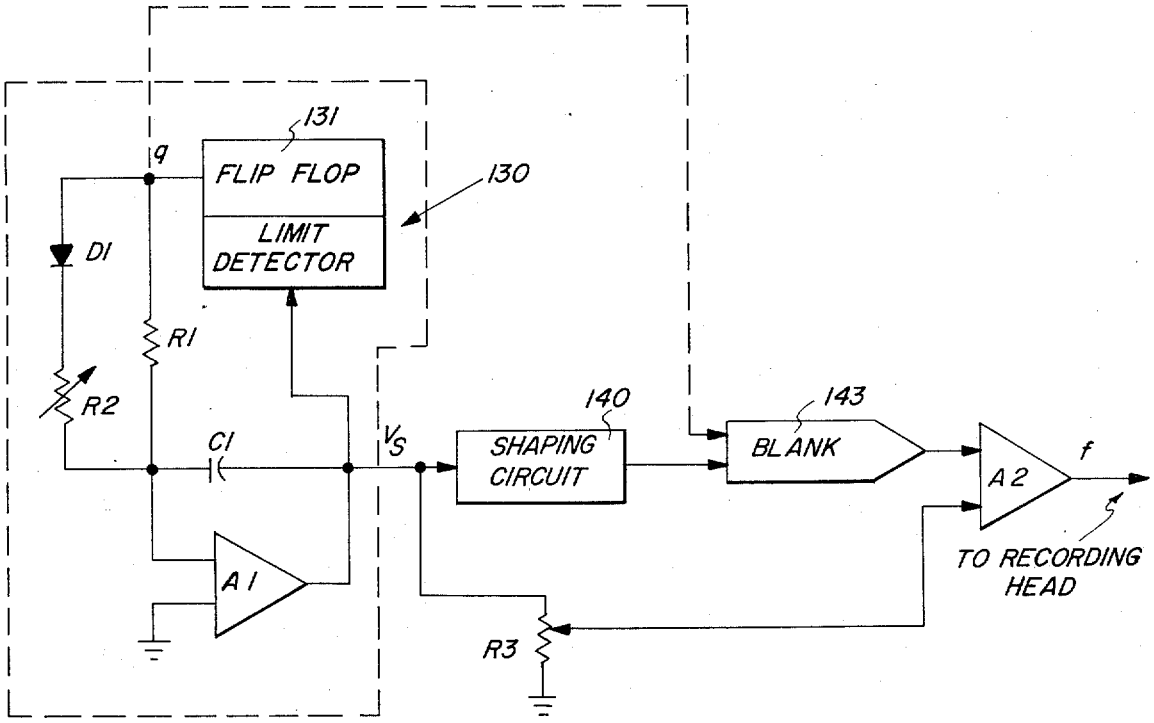
FIG. 13 is an electrical schematic of circuitry for driving the cutting stylus to produce one side of the radiation-redistributive surface illustrated in FIGS. 4–6.

Circuitry for driving the cutting stylus to produce a depth profile such as illustrated in FIG. 5 is illustrated in FIGS. 13 and 14. To facilitate an understanding of the circuitry, only that portion which is used to cut half of the screen master, either the upper or lower half, is initially described. The additional logic circuits required to cut the entire screen surface are illustrated in FIG. 14.

In FIG. 13, circuitry is disclosed for generating the electrical waveform whereby the cutting stylus can be modulated to produce microelements having depth profiles similar to those illustrated in FIGS. 5a and 5b. It has been found that the required electrical waveform can be achieved by adding a sawtooth waveform, in varying amounts depending upon the y-position of the cutting stylus, to the asymmetrical waveform required for producing the desired depth profile at the screen center ($y = 0$). To generate the necessary sawtooth waveform, a sawtooth generator 130 is provided, such generator comprising a flip-flop 131, a limit detector 132, resistors $R_1$ and $R_2$, diode D1, capacitor C1 and operational amplifier A1. Amplifier A1 is connected as an integrator to give a linear ramp while the voltage at q, $V_q$, is constant. When $V_q$ is negative, the ramp output $V_s$ of the sawtooth generator is positive-going. When $V_s$ exceeds the positive threshold of limit detector 132, flip-flop 131 is switched to make $V_q$ positive, at which time $V_s$ becomes negative-going. When $V_s$ reaches a negative limit, the flip-flop is again switched, to make $V_q$ negative again. Operational amplifier A1 preferably has complementary outputs, and the limit detector 132 acts by detecting the negative limit of first one output and then the other. The slopes of the positive- and negative-going ramps of the sawtooth are controlled by diode D1 and resistors R1 and R2, the latter being variable. Diode D1 is non-conducting when $V_q$ is negative, and conducts only when $V_q$ is positive. Therefore, the positive-going ramp is slower than the negative-going ramp because the slope of the former is determined by the current flowing through resistor R1 only, whereas the slope of the latter is determined by the current flowing through both resistors R1 and R2. By varying the value of resistor R2, the slope of the negative-going ramp can be varied.

The sawtooth output of generator 130 is then fed through a non-linear shaping circuit 140 which, as shown in FIG. 15, acts to convert the linear ramp 141 to the asymmetrical waveform 142 required to drive the cutting stylus to achieve the desired shape of the microelements at the screen center. To prevent that portion of the shaping circuit output which occurs during the flyback (fast-sloped negative-going ramp) of the sawtooth from being applied to the cutting stylus, a blanking gate 143 is provided which transmits the input signal from the shaping circuit only when $V_q$ is negative (i.e., during the slow ramp). The output of the shaping circuit 140 produces a depth profile for the screen elements at $y = 0$. To produce the required depth profile as the y-position of the cutting stylus gradually increases, it is necessary to gradually "tilt" the $y = 0$ depth profile. Such gradual tilting is accomplished by gradually adding, as the y-position of the cutting stylus gradually increases, the sawtooth waveform $V_s$ to the output of the shaping circuit 140. Such addition is accomplished by operational amplifier A2. To vary the contribution of the sawtooth waveform, resistor R3 is mechanically varied by the y-position of the milling machine carriage. In FIG. 16, the output f of the amplifier A2 is illustrated when the cutting stylus is in a position displaced along the y axis from screen center.

To provide an electrical waveform whereby the cutting stylus can be modulated in such a manner as to properly vary the groove depth on both sides of the screen center, it is necessary to provide circuitry for interchanging the direction of the fast and slow slopes of the sawtooth (i.e., change the sense of the sawtooth) as the cutting stylus passes through the center of the screen. Moreover, it is necessry to switch the shape-blanking so that gate 143 operates during the fast-sloped portion of the sawtooth, whether positive or negative-going. The required circuitry is illustrated in FIG. 14. To switch the sense of the sawtooth at $y = 0$, the fast-sloped diode D1 of FIG. 13 is replaced by an "exclusive OR" gate 150, the output of which is controlled by a flip-flop 151. The output of flip-flop 151 is controlled by a switch on the milling machine carriage, switching from one state to another as the screen center ($y = 0$) passes the cutting stylus. To properly cut both sides of the screen surface, it is necessry to provide an additional shaping circuit 152 since the asymmetry caused by the arcuate movement of the cutting stylus does not depend on the particular portion of the screen being cut. The output of the proper shaping circuit is supplied to amplifier A2, during the slow ramp portion of the output of the sawtooth generator, through blanking gates 143 and 153 which are controlled respectively by NAND gate 155 and OR gate 156.

To initiate the cutting operation, a start button is pressed which pivots the cutting assembly 40 about pin 44 into a cutting position, causes the hydraulic-pneumatic motor 95 to move the milling machine carriage in the y direction and causes the above-described electronic circuitry to drive the cutting stylus according to the waveform of the electrical signal applied thereto. After cutting a groove of predetermined length, a microswitch (not shown) is actuated by carriage 93 which serves to stop pneumatic motor 95, activate a solenoid which moves cam 46 of the recording head clockwise into a position to pivot the cutting assembly into an inoperative position, and actuate stepping motor 90 so as to move workbed 88 a predetermined distance in the x direction. The microswitch also returns the milling machine carriage to its starting position on the y-axis which, in turn, actuates a second microswitch. When actuated, the second microswitch rotates cam 46 counterclockwise to permit the recording head to pivot into an operable cutting position, and the cutting process is repeated. This process continues without interruption until the entire screen master has been out.

As the heated stylus S cuts a groove in the acetate coating, a continuous [silver] *sliver* or chip is extricated from the workpiece surface. To continuously draw this [silver] *sliver* away from the workpiece, a vacuum nozzle 162 (shown in FIG. 7) connected to a vacuum source through hose 163, is positioned adjacent stylus S during the cutting operation. The maximum depth of cut produced by the stylus in the acetate coating is controlled by ball follower 51 which, as mentioned hereinabove, rides on an uncut portion of the coating, near the stylus. The recording head includes a mechanism for maintaining the distance between the stylus tip and the base of the ball constant. Preferably, the groove spacing and minimum groove depth are set such that no "land" or flat areas exist between adjacent grooves.

Another projection screen embodying the present invention is illustrated in FIGS. 17–19 and is generally designated by the reference numeral 200. Like the aforedescribed screen, the surface of screen 200 comprises a plurality of contiguous microelements having boundaries defined in a transverse direction by cusp lines 201 formed by the intersecting edges of adjacent linear grooves 202, and in a longitudinal direction by periodic shifts occurring along lines 203 in the groove depth profile from concave to convex. However, unlike the aforedescribed screen, the contour of all microelements comprising the surface of screen 200 is substantially identical, each being contoured such as to uniformly distribute (i.e., distribute with constant luminance) normally incident image light throughout the same horizontal and vertical audience angles. Each microelement has transverse and longitudinal cross sections defined by the above equations. In order to satisfy Postulate I set forth above, namely that each elemental area on the screen surface distribute image light only throughout an angle just large enough to encompass a predefined viewing area, it is necessary to orient each microelement on the screen surface such that the planes which bisects its vertical and horizontal audience angles intersects with similar bisecting planes of all other microelements at a point remote from the screen surface. Preferably, such orientation is accomplished by giving the screen surface a substantially spherical shape, the center of spherical curvature corresponding to the desired point of intersection of the optical axes of the microelements.

Rather than curving the screen surface to effectively adjust the orientation of each microelement, Postulate I could be satisfied by adjusting the angle at which image light impinges upon each microelement. Such adjustment could be accomplished in the case of a rear projection screen by providing the rear surface 205 of the projection screen, that is, the surface closest to the projector, with a Fresnel-like lens See FIGS. 18a and 19a. Obviously, combinations of Fresnel lenses and other screen curvatures, such as cylindrical, could be used.

To fabricate screens of the type illustrated in FIGS. 17–19, a flat master is initially made using the techniques and apparatus described above. From the master, a flexible negative matrix is made, which may be subsequently curved and used to generate correspondingly curved positive projection screens by the molding techniques described hereinbelow.

Figure 20:
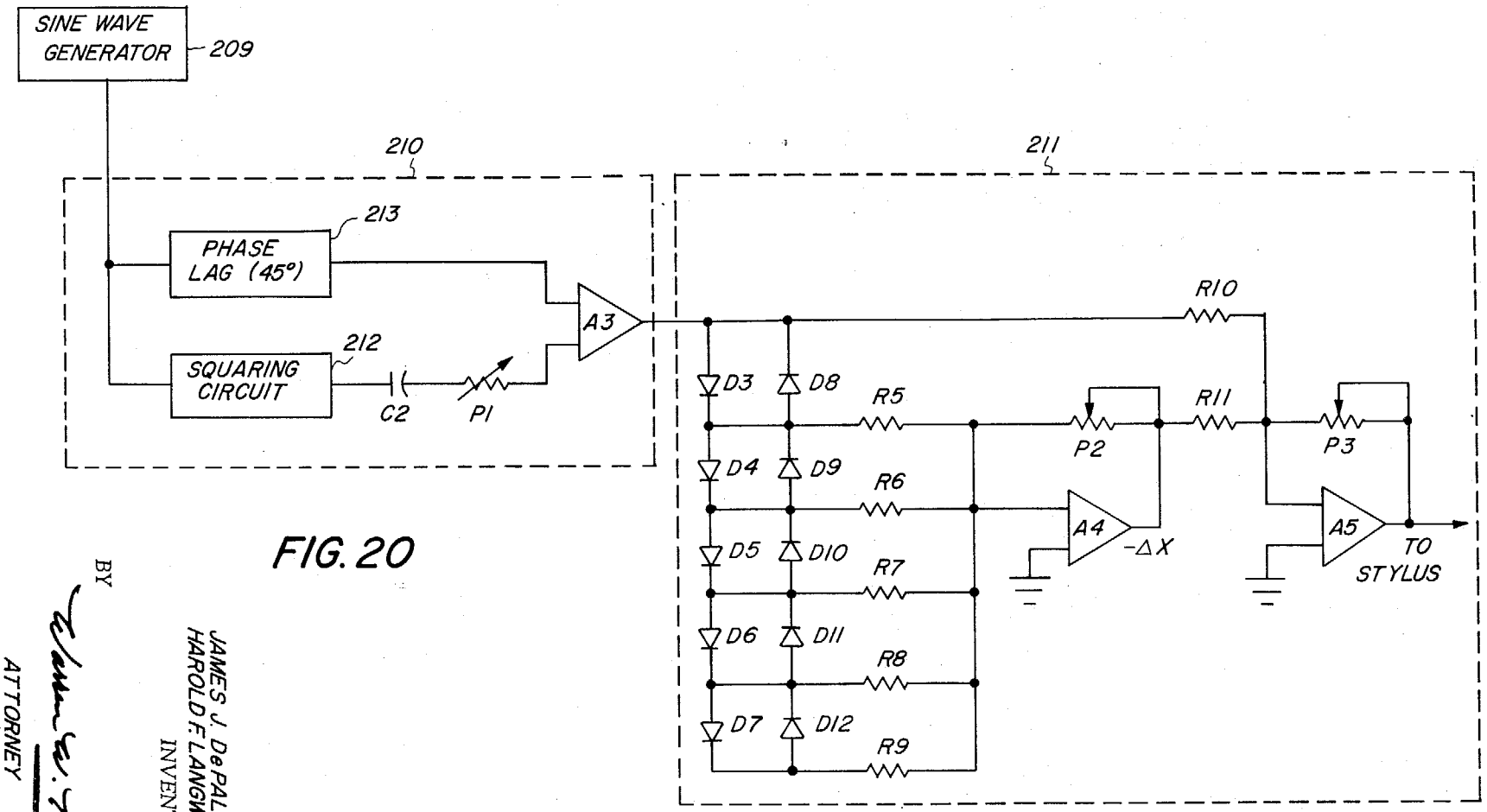
FIG. 20 is an electrical schematic of circuitry adapted to drive the cutting stylus in a manner such as to produce a master from which radiation-redistributive devices, such as that illustrated in FIGS. 17–19, can be fabricated.

In fabricating the master, both channels of the above-described stereo sound recording head are fed electrical waveforms defined by Equations (1) and (2) above, at $\theta = 0$. In FIG. 20, electronic circuitry is schematically illustrated for generating the required waveform. As previously indicated, such waveform differs from a true sine wave in that the peaks are flattened, relative to the lower-amplitude portions of the wave. Moreover, as also mentioned hereinabove, to produce a groove depth profile in accordance with a desired waveform, it is necessary to drive the cutting stylus with an asymmetrical waveform which is converted to the desired waveform by the arcuate stylus movement. To produce the waveform required, the output (sin x) of a conventional sinewave generator 209 is first asymmetrically distorted by asymmetrical circuit 210 to compensate for the arcuate stylus movement, and then shaped by shaping circuit 211 to produce the waveform required for appropriately driving the cutting stylus S. It has been found that by adding to the sine waveform a small amount of its second harmonic, the requisite asymmetrical distortion can be achieved. A squaring circuit 212, such as an analog multiplier module, is used to generate the second harmonic waveform (sin 2x) from the fundamental. Capacitor C2 is used to eliminate the dc component of the squaring circuit output so as to produce a positive- and negative-going signal. Since the midpoint of the resulting waveform lags the sin x waveform by 45°, it is necessary to feed the output of the sine wave generator through a simple RC phase-lagging circuit 213. In this manner, the two waves are added while in phase by operational amplifier A3. The amount of asymmetry in the output of amplifier A3 depends, of course, on the peak-to-peak amplitude of the added second harmonic. Potentiometer P1 serves to vary the second harmonic amplitude prior to being added to the fundamental.

To produce the desired waveform from the asymmetrically distorted sine wave output of circuit 210, such output is fed to the shaping circuit 211. The input signal to shaping circuit 211 is segmented by reason of having to overcome successively the forward voltage drops across diodes D3–D12. Diodes D3–D7 and D8–D12 serve to segment the positive- and negative-going portions of the input signal, respectively. Operational amplifier A4 serves to sum the contributions of the various segments to produce a difference signal $\Delta x$ having a waveform representing the difference by which the desired waveform differs from the asymmetrically distorted sine wave input. The contributions of the individual segments to the output of amplifier A4 are adjusted by varying the values of resistors R5–R9. The output of amplifier A4 is adjustable in amplitude by potentiometer P2. Resistors R10 and R11 and potentiometer P2 serve to control the gain of amplifier A5. By simply adding the difference signal $\Delta x$, which is of a polarity opposite that of the unshaped signal due to the polarity reversing affect of amplifier A4, to the unshaped signal, the desired waveform for driving the cutting stylus is achieved. Such addition is performed by operational amplifier A5. Resistors R10 and R11 and potentiometer P3 serve to control the gain provided by the summing amplifier A5. The output of amplifier A5 is then used as the inputs to both driving coils of the stereo recording head to drive the cutting stylus.

After making the projection screen master in accordance with the aforedescribed method and apparatus, projection screens can be produced therefrom by making a negative matrix or master from the original, and casting positive screens, in a resinous material, from the negative master. Preferably, the negative master is made from General Electric RTV-60 silicone rubber which is prepared by adding 3 grams of dibutyl tin dilaurate RTV curing catalyst to 2 pounds of the RTV-60 rubber, agitating the mixture with an electric stirrer for 5 minutes and then placing it in a bell jar which is then evacuated to a pressure of 150 microns of mercury for about 20 minutes. Upon fixing sidewalls to the edge of the original master, the RTV rubber mixture can then be poured into this mold so that no air is entrapped. After curing, the rubber mold can then be used to cast projection screens.

To fabricate spherically or otherwise curved front projection screens of the type depicted in FIGS. 17–19, the rubber negative mold is disposed on an appropriately curved support prior to casting. A maraglas resin, after being degassed, is then poured into the mold. After heating in an oven at 200° F for several hours to harden the resin, the casting can be coated with an aluminum coating to form a front projection screen. Refractive or rear projection screens can be made from a planar master by incorporating a Fresnel-like lens on the castings replicated therefrom.

As indicated above front and rear projection screens merely constitute a preferred embodiment of the invention and it should be understood that other radiation-redistributive devices, such as those already mentioned, as well as the many obvious variations and modifications of the invention as described, are considered within the spirit and scope of the invention.

We claim:

1. A radiation-redistributive device having a surface defining a plurality of parallel grooves, each of said grooves having a depth which undulates along the groove length to define a row of alternately concave and convex optical microelements, each of said microelements being contoured to redistribute incident radiation in such a manner as to produce substantially uniform radiance throughout predefined vertical and horizontal field angles and being disposed such that a plane which bisects one of its field angles and which extends [perpendicular] *transverse* to the groove length intersects with similarly defined planes of all other microelements substantially along a first line which extends parallel to said surface and is in a plane perpendicular to the groove length.

2. The invention according to claim 1 wherein said surface is cylindrically curved about said first line.

3. The invention according to claim 1 wherein said grooves are rectilinear.

4. The invention according to claim 3 wherein said grooves are contiguously arranged to form cusp lines at the juncture of adjacent grooves, said cusp lines undulating in a plane perpendicular to said surface and extending substantially parallel to the groove length.

5. The invention according to claim 1 wherein each of said microelements is disposed such that the plane which bisects the other of its field angles and which extends parallel to the groove length intersects with similarly defined planes of all microelements substantially along a second line which perpendicularly intersects said first line and is in a plane parallel to the screen surface.

6. The invention according to claim 5 wherein said grooves are rectilinear.

7. The invention according to claim 5 wherein said surface is cylindrically curved about said second line.

8. The invention according to claim 5 wherein said surface is substantially reflective so as to reflect radiation emanating from a source on one side of the screen to a field situated on the same side of the screen as the source.

9. The invention according to claim 5 wherein the screen, including said surface, is substantially transparent so as to refract radiation emanating from a source on one side of the screen to a field situated on the opposite side of the screen from the source.

10. The invention according to claim 5 wherein said surface is spherically curved about the intersection of said first and second lines.

11. A projection screen for presenting a predefined field of observation an image projected thereon by a projecting apparatus, said screen having a surface defining a plurality of contiguous grooves, each of said grooves having a depth which periodically undulates along the groove length and thereby defines a row of alternately concave and convex optical microelements, each of said grooves having a transverse cross section which is substantially defined by at least a segment of a first curve $$u = \pm g(w;n) = \pm (\sqrt{1+w}\,(\sqrt{-w} - 2n) + \cos^{-1}\sqrt{-w})$$

where w and u are the coordinates of said curve, w being measured in a direction parallel to the path of incident image light, u being measured in a direction perpendicular to w and in the plane of the cross section; and n is the refractive index of the microelement (n being −1 when the microelement is reflective); and w has a value with the limits:

$-1 \leq w \leq -\cos^2(B+\theta')$, when g(w;n) is positive and the microelement is refractive;

$-1 \leq w \leq -\cos^2(A-\theta')$, when g(w;n) is negative and the microelement is refractive;

$-1 \leq w \leq -\cos^2(A=\theta)$, when g(w;n) is positive and the microelement is reflective; and $-1 \leq w \leq -\cos^2(B+\theta)$, when g(w;n) is negative and the microelement is reflective;

where $\theta$ is the projection in the u − w plane of the angle formed by a line extending parallel to incident image light, and the normal to the screen surface; $n = \sin\theta/\sin\theta'$; and A and B are the audience angles, measured from a normal to the screen surface and in the plane of the cross section, through which incident image light must be distributed to just encompass said field of observation.

12. The invention according to claim 11 wherein each of said microelements has a longitudinal cross section, taken in a plane parallel to the groove length and normal to said surface, substantially defined by at least a segment of said first curve, and A and B and u are measured in the plane of said longitudinal cross section, and by at least a segment of a second curve $$u = \pm f(w;n) = \pm (\sqrt{1-w}\,(\sqrt{w} + 2n) + \cos^{-1}\sqrt{w})$$

where w has a value within the following limits;

$\cos^2(A - \theta') \leq w \leq 1$, when f(w;n) is positive and the microelement is refractive;

$\cos^2(B + \theta') \leq w \leq 1$, when f(w;n) is negative and the microelement is refractive;

$\cos^2(B + \theta) \leq w \leq 1$, when f(w;n) is positive and the microelement is reflective;

$\cos^2(A - \theta \leq w \leq 1$ when f(w;n) is negative and the microelement is reflective.

13. A rear projection screen for presenting an image projected thereon to a predefined audience space, said screen comprising a sheet of substantially transparent material having a first surface comprising means defining a plurality of contiguous grooves each of said grooves having a transverse cross section defined by at least a segment of the curve $$u = \pm g(w;n) = \pm (\sqrt{1 + w}\,(\sqrt{-w} - 2n) + \cos^{-1}\sqrt{-w})$$

where w and u are the curve coordinates, w being measured in a direction parallel to the path of incident image light, u being measured in a direction perpendicular to w and in the plane of the cross section; n is the refractive index of said material, and w has a value within the limits $-1 \leqq w \leqq -\cos^2(B + \theta')$, when g(w;n) is positive, and $-1 \leqq w \leqq -\cos^2(A - \theta')$, when g(w;n) is negative;

where A and B are the angles, measured from the normal to said first surface in the plane of the cross section, through which each groove redistributes image light to just encompass said audience space, and $\sin \theta' = \sin \theta/n$, where $\theta$ is the projection in the $u - w$ plane of the angle formed by the line extending parallel to incident image light and the normal to said first surface.

14. The invention according to claim 13 wherein said first surface is substantially planar, and said sheet of material has a second surface, spaced from and extending substantially parallel to said first surface, comprising means defining a Fresnel-type lens.

15. The invention according to claim 14 wherein each of said grooves has a depth which periodically undulates along the groove length to define a row of alternately concave and convex optical microelements.

16. A rear projection screen for presenting an image projected thereon to a predefined audience space, said screen comprising a sheet of substantially transparent material having a first surface comprising means defining a plurality of contiguous grooves, each of said grooves having a transverse cross section defined by at least a segment of the curve.

$$u = \pm f(w;n) = \pm (\sqrt{1 - w}\,(\sqrt{w} + 2n) + \cos^{-1}\sqrt{w})$$

where w and u are the curve coordinates, w being measured in a direction parallel to the path of incident image light and u being measured in a direction perpendicular to w in the plane of the cross section; n is the refractive index of said material, an w has a value within the following limits;

$\cos^2(A - \theta') \leq w \leq 1$, when f(w;n) is positive; and $\cos^2(B + \theta') \leq w \leq 1$, when f(w;n) is negative;

where A and B are the angles, measured from the normal to said first surface in the plane of the cross section, through which each groove redistributes incident image light to just encompass said audience space, and $\sin \theta' = \sin \theta/n$, where $\theta$ is the projection in the $u - w$ plane of the angle formed by the line extending parallel to incident image light and the normal to said first surface.

17. The invention according to claim 16 wherein said first surface is substantially planar, and said sheet of material has a second surface, spaced from and extending substantially parallel to said first surface, comprising means defining a Fresnel-type lens.

18. The invention according to claim 17 wherein each of said grooves has a depth which periodically undulates along the groove length to define a row of alternately concave and convex optical microelements.

* * * * *